US012784979B2

(12) United States Patent
Lim et al.

(10) Patent No.: US 12,784,979 B2
(45) Date of Patent: Nov. 3, 2026

(54) CERAMIC CAPACITOR AND MANUFACTURING METHOD THEREFOR

(71) Applicant: AMOTECH CO., LTD., Incheon (KR)

(72) Inventors: Byungguk Lim, Incheon (KR); Yunsuk Choi, Incheon (KR); Jaeyong Song, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 230 days.

(21) Appl. No.: 18/719,253

(22) PCT Filed: Dec. 5, 2022

(86) PCT No.: PCT/KR2022/019564
§ 371 (c)(1),
(2) Date: Jun. 12, 2024

(87) PCT Pub. No.: WO2023/113335
PCT Pub. Date: Jun. 22, 2023

(65) Prior Publication Data
US 2026/0171312 A1 Jun. 18, 2026

(30) Foreign Application Priority Data
Dec. 13, 2021 (KR) ........................ 10-2021-0177955

(51) Int. Cl.
*H01G 4/228* (2006.01)
*H01G 2/06* (2006.01)
(Continued)

(52) U.S. Cl.
CPC ........... *H01G 4/1227* (2013.01); *H01G 2/065* (2013.01); *H01G 4/012* (2013.01); *H01G 4/12* (2013.01);
(Continued)

(58) Field of Classification Search
None
See application file for complete search history.

(56) References Cited

U.S. PATENT DOCUMENTS 10,622,150 B2 * 4/2020 Onodera .............. H01G 4/2325
10,840,021 B2 * 11/2020 Yamada ................. H01G 4/232
(Continued)

FOREIGN PATENT DOCUMENTS

JP 2018-088451 A 6/2018
JP 2019-083253 A 5/2019
(Continued)

OTHER PUBLICATIONS

KR Office Action dated May 16, 2024 as received in Application No. 10-2021-0177955.
(Continued)

*Primary Examiner* — Dion R. Ferguson
(74) *Attorney, Agent, or Firm* — Maschoff Brennan

(57) ABSTRACT

The present invention relates to a ceramic capacitor comprising: a plurality of dielectric layers; a ceramic body having front and rear surfaces facing each other, upper and lower surfaces facing each other, and both end surfaces facing each other; at least a pair of inner electrodes arranged to be spaced a predetermined interval apart inside the ceramic body so that each end thereof is exposed to either end surface of the ceramic body; and outer electrodes electrically connected to the inner electrodes, wherein the outer electrode includes electrode layers formed at both end surfaces of the ceramic body, and a conductive resin layer for covering a part of the electrode layer and encompassing the lower edge of the ceramic body. In the present invention, an external electrode having improved shock absorption efficiency is applied so that the occurrence of cracks can be prevented.

5 Claims, 7 Drawing Sheets

(51) Int. Cl.

| | |
|---|---|
| ***H01G 4/012*** | (2006.01) |
| ***H01G 4/12*** | (2006.01) |
| ***H01G 4/232*** | (2006.01) |
| ***H01G 4/30*** | (2006.01) |

(52) U.S. Cl.

CPC ........... *H01G 4/1209* (2013.01); *H01G 4/228* (2013.01); *H01G 4/2325* (2013.01); *H01G 4/30* (2013.01)

(56) References Cited

U.S. PATENT DOCUMENTS

| | | | | |
|---|---|---|---|---|
| 11,264,172 | B2 * | 3/2022 | Onodera | H01G 4/12 |
| 2013/0170095 | A1 * | 7/2013 | Oh | H01G 4/008<br>361/305 |
| 2014/0085767 | A1 * | 3/2014 | Kang | H01G 13/00<br>361/301.4 |
| 2014/0192453 | A1 * | 7/2014 | Hong | H01G 4/12<br>156/89.18 |
| 2015/0162132 | A1 * | 6/2015 | Kwag | H01G 4/2325<br>361/301.4 |
| 2015/0243439 | A1 * | 8/2015 | Kwag | H05K 1/181<br>361/301.4 |
| 2015/0287533 | A1 * | 10/2015 | Lee | H01G 4/232<br>361/301.4 |
| 2016/0093442 | A1 * | 3/2016 | Nagamoto | H01G 4/0085<br>361/301.4 |
| 2016/0351332 | A1 * | 12/2016 | Lee | H01G 4/232 |
| 2016/0365196 | A1 * | 12/2016 | Song | H01G 2/065 |
| 2018/0151296 | A1 * | 5/2018 | Yamada | H01G 2/065 |
| 2018/0174753 | A1 * | 6/2018 | Terashita | H01G 4/008 |
| 2019/0237250 | A1 * | 8/2019 | Onodera | H01G 2/065 |
| 2022/0139626 | A1 * | 5/2022 | Cho | H01G 4/248<br>174/260 |
| 2025/0232926 | A1 * | 7/2025 | Lim | H01G 4/012 |

FOREIGN PATENT DOCUMENTS

| | | | |
|---|---|---|---|
| KR | 10-1245347 | B1 | 3/2013 |
| KR | 10-2014-0040547 | A | 4/2014 |
| KR | 10-2014-0090466 | A | 7/2014 |
| KR | 10-2018-0017012 | A | 2/2018 |
| KR | 10-2019-0093149 | A | 8/2019 |
| WO | 2016/200574 | A1 | 12/2016 |

OTHER PUBLICATIONS

KR Office Action dated Jan. 10, 2025 as received in Application No. 10-2021-0177955.

* cited by examiner

[FIG. 1]
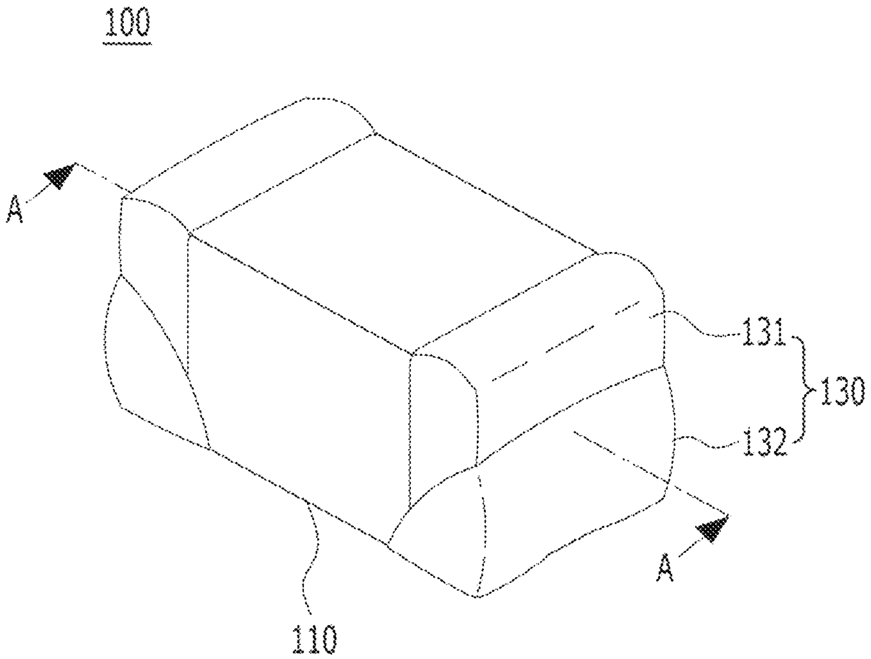
[FIG. 2]
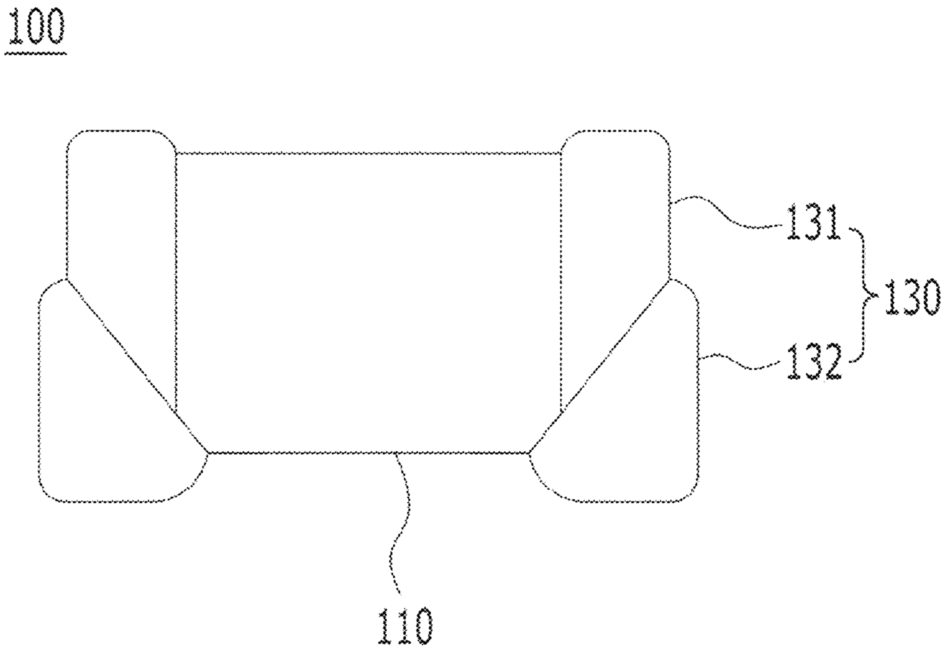

[FIG. 3]
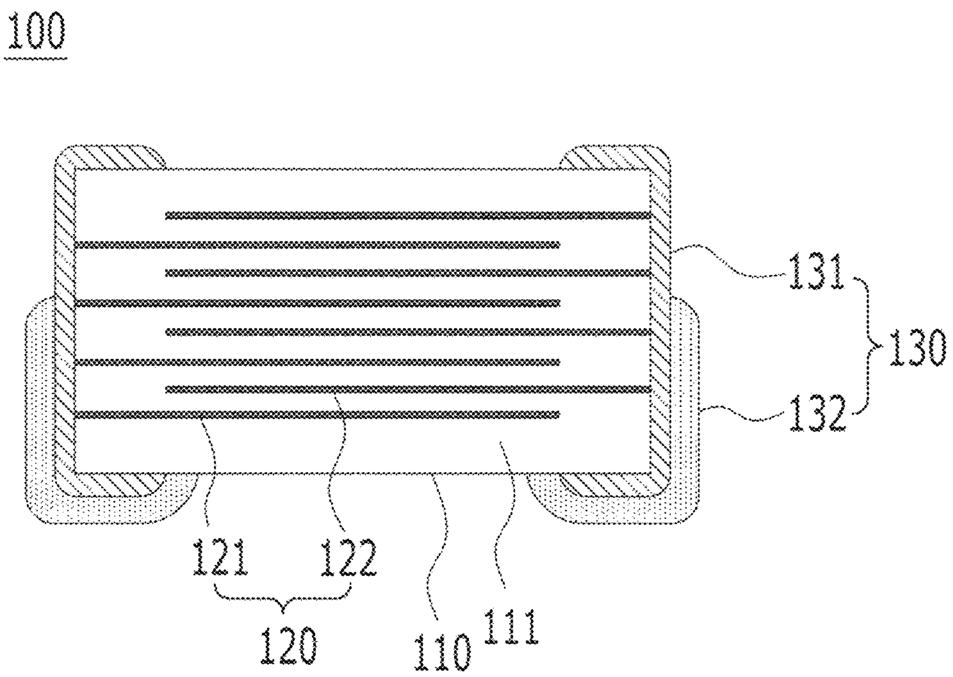
[FIG. 4]
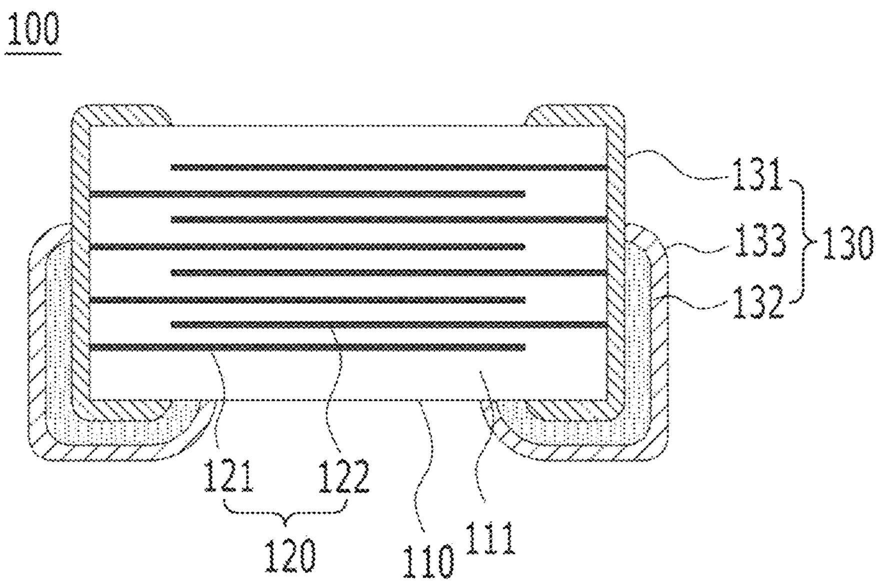

[FIG. 5]
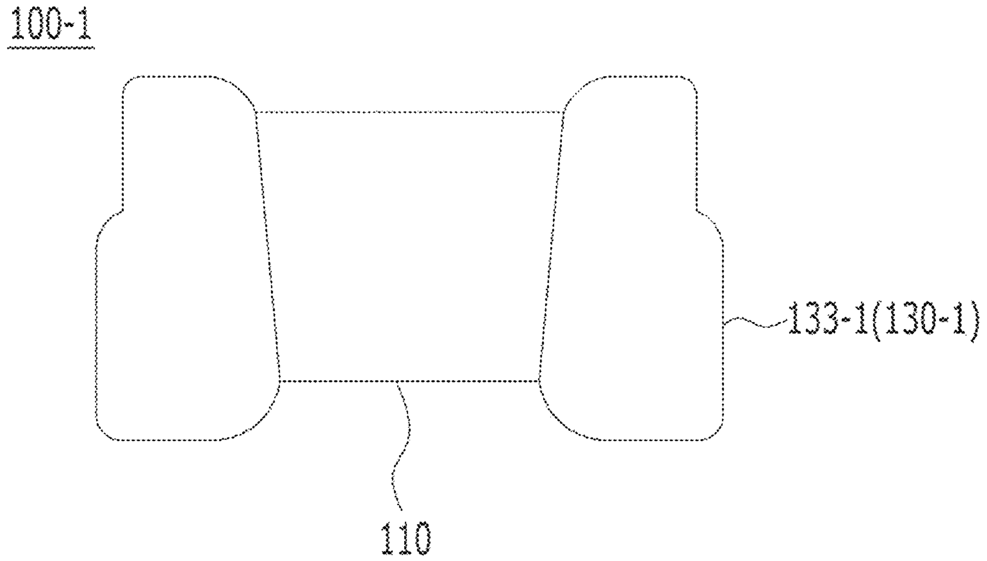
[FIG. 6]
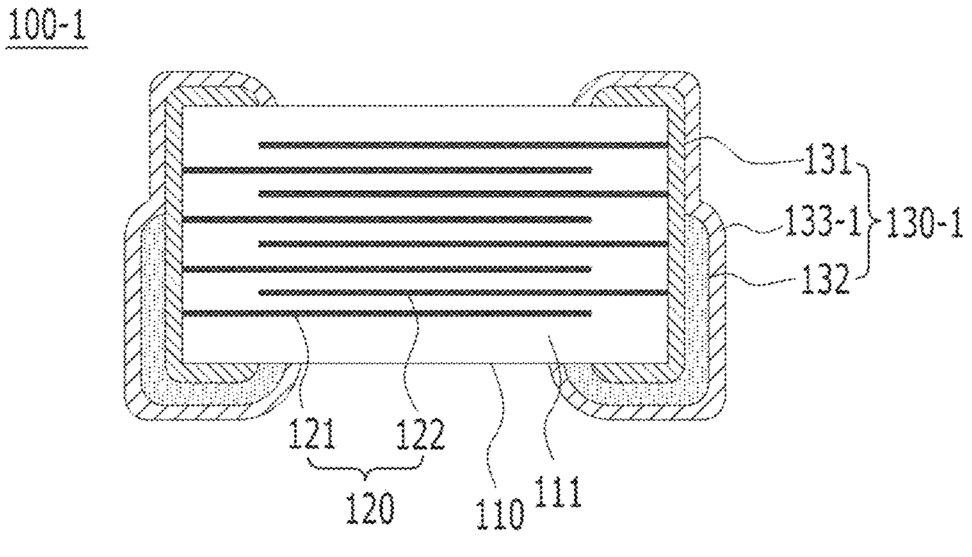

[FIG. 7]
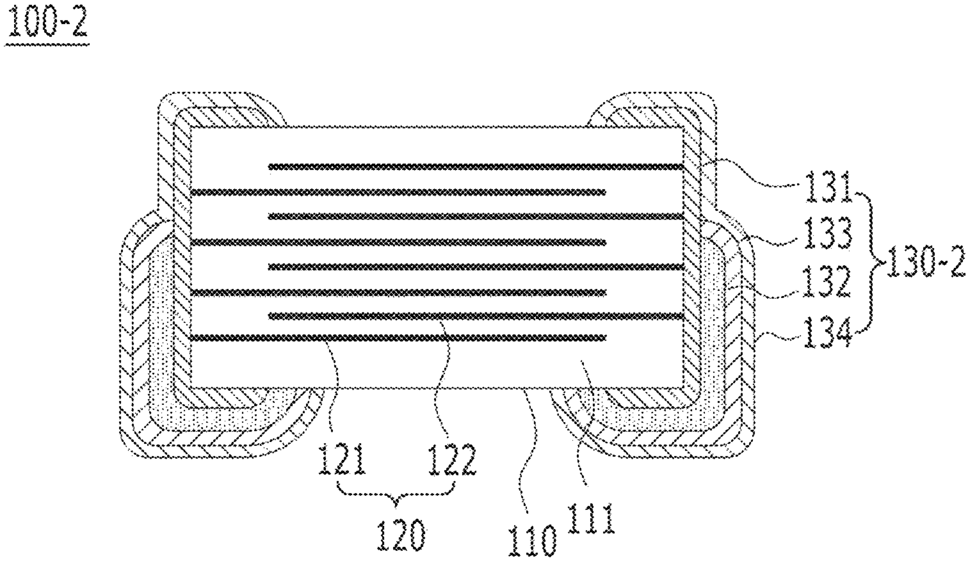
[FIG. 8]
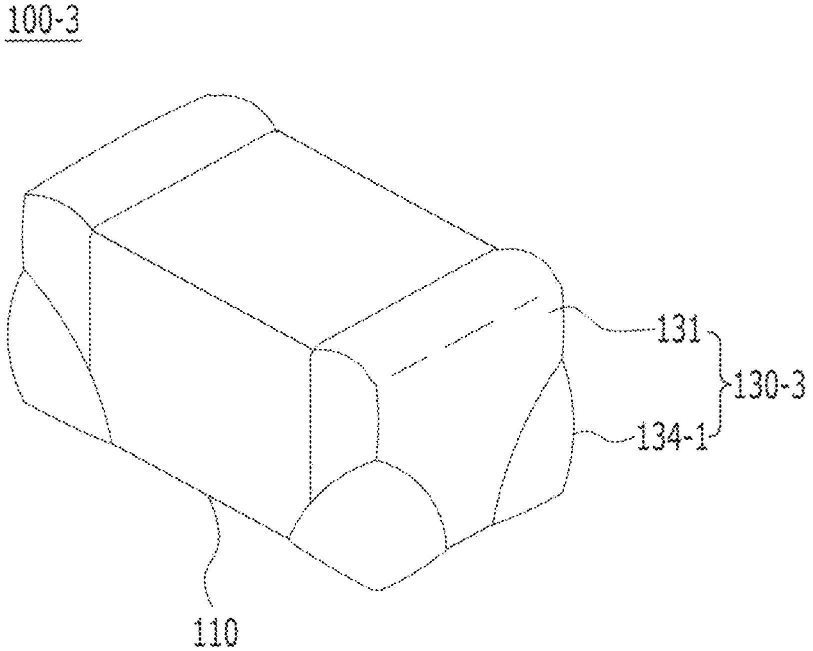

[FIG. 9]
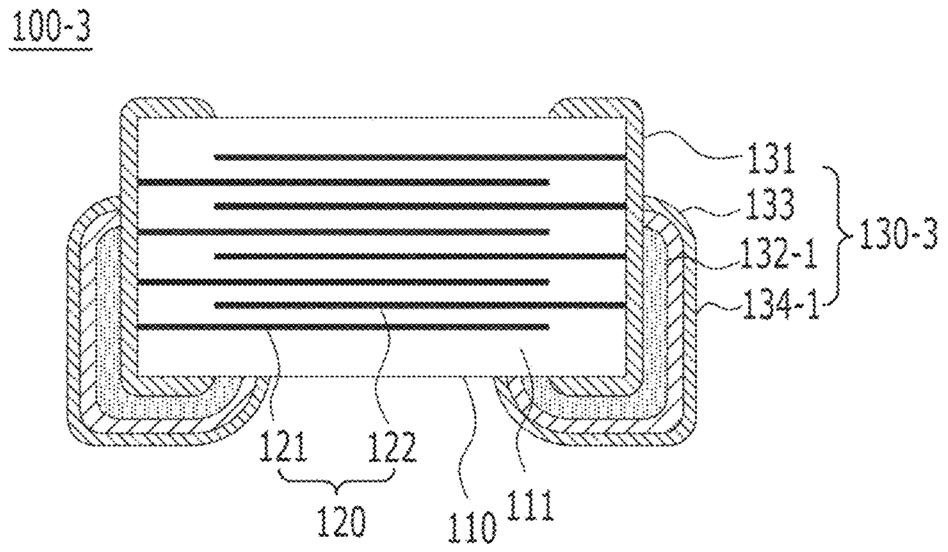
[FIG. 10]
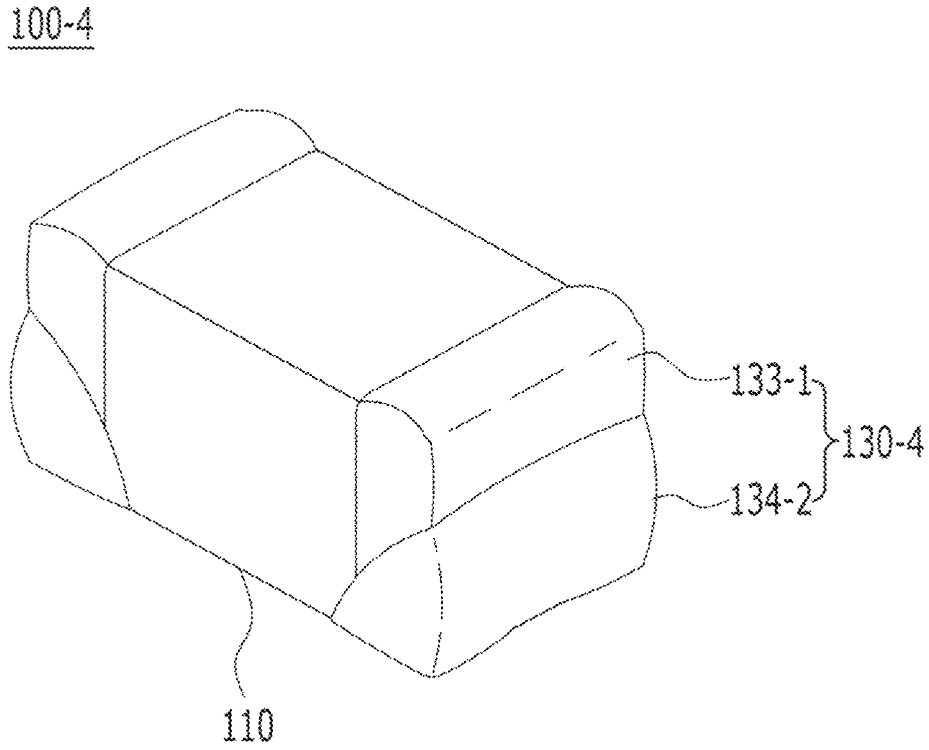

[FIG. 11]
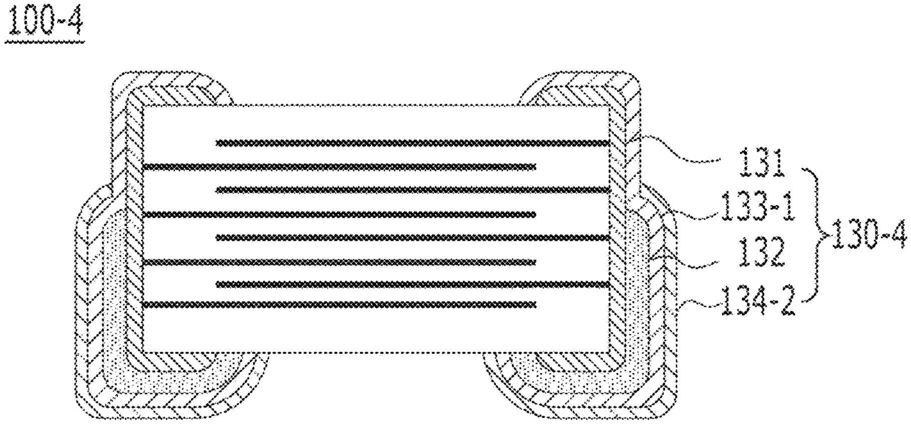
[FIG. 12]
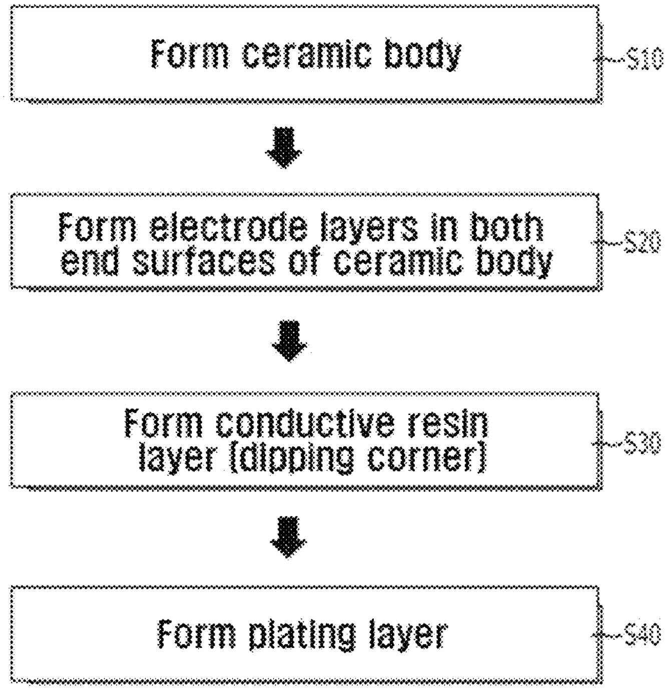

[FIG. 13]
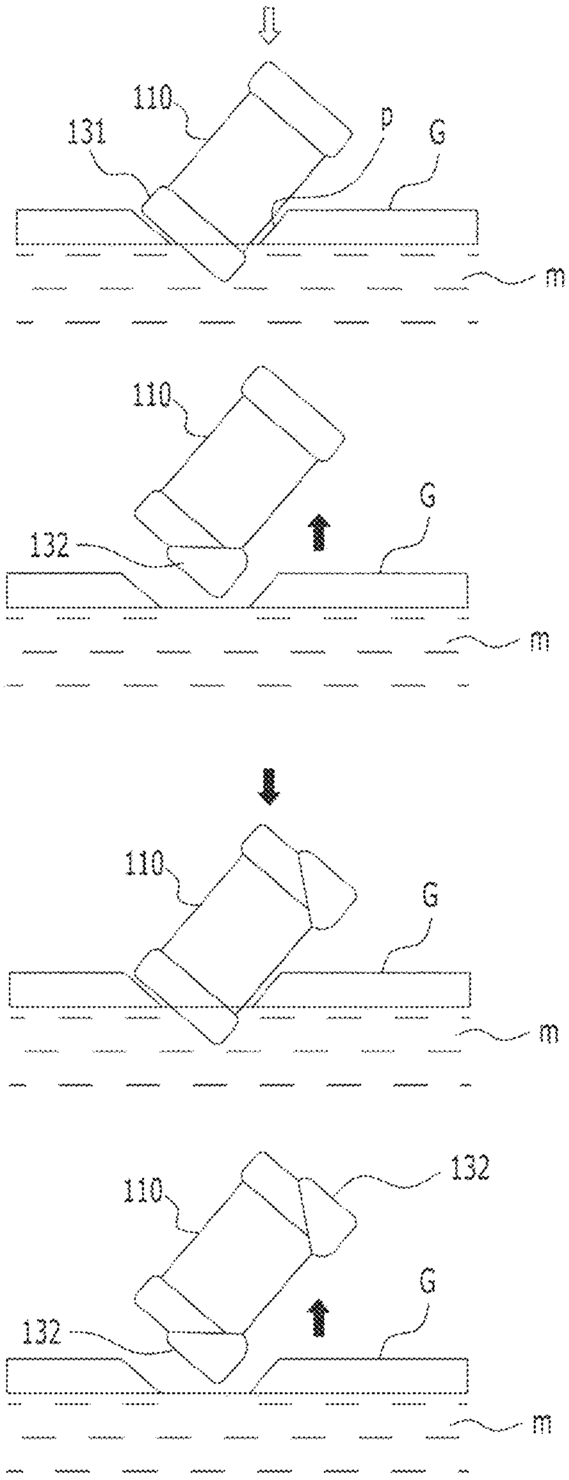

CERAMIC CAPACITOR AND MANUFACTURING METHOD THEREFOR

TECHNICAL FIELD

The present disclosure relates to a ceramic capacitor, and more particularly, to a ceramic capacitor to which an external electrode having improved shock absorption efficiency is applied and a method of manufacturing the same.

BACKGROUND ART

A capacitor is used to protect a corresponding part by storing electricity when there is a part for which a voltage needs to be constantly maintained and uniformly and stably supplying electricity required by the part, used to remove noise within an electronic device, or used to transmit only an AC signal from a signal in which a DC and an AC are mixed.

In general, a ceramic capacitor consists of a dielectric, an internal electrode, and an external electrode. The ceramic capacitor has internal electrodes of many layers accumulated within a limited space because electric charges are accumulated between the internal electrodes that face each other, thereby implementing miniaturization and a higher capacity. In such a capacitor, a crack is likely to occur at a corner part that is under a lot of stress due to a difference in a coefficient of thermal expansion when the ceramic capacitor is mounted on a board. The ceramic capacitor has a problem in that reliability is reduced because characteristics of the ceramic capacitor are changed by a fine crack and the ceramic capacitor does not operate when two terminals of the ceramic capacitor are circuit-shorted due to the crack.

The contents described in the Background Art are to help the understanding of the background of the disclosure, and may include contents that are not a disclosed conventional technology.

DISCLOSURE

Technical Problem

An object of the present disclosure is to provide a stack type ceramic capacitor, which can prevent the occurrence of a crack by applying an external electrode having improved shock absorption efficiency and can have a broadband characteristic by increasing ESR by using an electrode layer having high resistance in an external electrode, and a method of manufacturing the same.

Technical Solution

A ceramic capacitor according to an embodiment of the present disclosure for solving the above problem includes a ceramic body including a plurality of dielectric layers and including front and rear surfaces that face each other, upper and lower surfaces that face each other, and both end surfaces that face each other, at least a pair of internal electrodes disposed to be spaced apart from each other at a certain interval in the ceramic body so that an end of each internal electrode is exposed to any one end surface, among the both end surfaces of the ceramic body, and an external electrode electrically connected to the internal electrode. The external electrode includes an electrode layer formed on each of the both end surfaces of the ceramic body and a conductive resin layer formed to surround a part of the electrode layer and to surround corners of a lower part of the ceramic body.

The electrode layer may have a shape in which the electrode layer extends from each of the both end surfaces of the ceramic body to the front surface, rear surface, upper surface, and lower surface thereof.

The conductive resin layer may include a part that is disposed on the electrode layer and a part that is disposed on the ceramic body.

The part of the conductive resin layer that is disposed on the ceramic body may be formed in the front and rear surfaces and lower surface of the ceramic body.

The conductive resin layer may have a shape in which the conductive resin layer extends from a middle part of each of the both end surfaces of the ceramic body to the lower surface thereof.

The conductive resin layer may have a shape in which the conductive resin layer exposes a middle part of the both end surfaces of the ceramic body.

The electrode layer may include Cu. The conductive resin layer may be made of resin including Ag.

The ceramic capacitor may further include a plating layer disposed to cover the electrode layer and the conductive resin layer.

The plating layer may have a one-layer structure including an Ni plating layer or a two-layer structure including an Ni plating layer and an Sn plating layer.

The plating layer may be disposed to cover the conductive resin layer.

Steps of forming a ceramic body including front and rear surfaces that face each other, upper and lower surfaces that face each other, and both end surfaces that face each other and having one end of an internal electrode exposed to the both end surfaces, forming an electrode layer in each of the both end surfaces of the ceramic body so that the electrode layer is electrically connected to the one end of the internal electrode, and forming a conductive resin layer that covers a part of the electrode layer and that surrounds corners of a lower part of the ceramic body are included.

The electrode layer may be formed by applying paste including conductive metal to each of the both end surfaces of the ceramic body and plasticizing the paste.

In the step of forming the conductive resin layer, the conductive resin layer may be formed by a method of dipping the corners of the lower part of the ceramic body in which the electrode layer has been formed into a resin solution including Ag.

In the method of dipping the corners of the lower part of the ceramic body in which the electrode layer has been formed into the resin solution including Ag, when the ceramic body is dipped into the resin solution including Ag, a dipping area of the corners of the ceramic body may be accurately controlled by a support jig that supports one side and the other side of the ceramic body at a predetermined angle. For example, the dipping of the corners of the ceramic body may be performed by using a support jig that supports one side and the other side of the ceramic body and in which an insertion hole having a bilateral slope has been formed so that corner parts of the ceramic body are disposed at the lowest place.

A step of forming a plating layer that covers the electrode layer and the conductive resin layer may be further included after the step of forming the conductive resin layer.

A step of forming a plating layer that covers a part of the electrode layer and the conductive resin layer may be further included after the step of forming the conductive resin layer.

Advantageous Effects

The present disclosure has an effect in that the reliability of the ceramic capacitor can be improved because the ceramic capacitor has a shock absorption function by forming the conductive resin layer in a lower corner area that is under the most stress and the occurrence of a crack is prevented although a corner part is under a lot of stress due to a difference in a coefficient of thermal expansion when the ceramic capacitor is mounted on a board.

Furthermore, the present disclosure has an effect in that a broadband characteristic can be implemented because the conductive resin layer includes Ag and has an electrical conductivity characteristic, but ESR can be adjusted through a method of increasing electrical resistance by lowering a content thereof.

DESCRIPTION OF DRAWINGS

FIG. 1 is a perspective view illustrating a ceramic capacitor according to a first embodiment of the present disclosure.

FIG. 2 is a front view illustrating the ceramic capacitor according to the first embodiment of the present disclosure.

FIG. 3 is a cross-sectional view taken along A-A in FIG. 1.

FIG. 4 is a longitudinal cross-sectional view illustrating a form including a first plating layer in the ceramic capacitor according to the first embodiment of the present disclosure.

FIG. 5 is a front view illustrating a form of a modified example including the first plating layer in the ceramic capacitor according to the first embodiment of the present disclosure.

FIG. 6 is a longitudinal cross-sectional view illustrating a form of a modified example including the first plating layer in the ceramic capacitor according to the first embodiment of the present disclosure.

FIG. 7 is a longitudinal cross-sectional view illustrating a form including a second plating layer in a ceramic capacitor according to a second embodiment of the present disclosure.

FIG. 8 is a perspective view illustrating a form of a first modified example including the second plating layer in the ceramic capacitor according to the second embodiment of the present disclosure.

FIG. 9 is a longitudinal cross-sectional view illustrating a form of the first modified example including the second plating layer in the ceramic capacitor according to the second embodiment of the present disclosure.

FIG. 10 is a perspective view illustrating a form of a second modified example including the second plating layer in the ceramic capacitor according to the second embodiment of the present disclosure.

FIG. 11 is a longitudinal cross-sectional view illustrating a form of the second modified example including the second plating layer in the ceramic capacitor according to the second embodiment of the present disclosure.

FIG. 12 is a process diagram illustrating a method of manufacturing a ceramic capacitor according to a first embodiment of the present disclosure.

FIG. 13 is a construction diagram illustrating a method of forming a conductive resin layer in the method of manufacturing a ceramic capacitor according to the first embodiment of the present disclosure.

BEST MODE

Hereinafter, preferred embodiments of the present disclosure are described in detail with reference to the accompanying drawings.

The present disclosure is characterized in that it improves shock absorption efficiency by including a conductive resin layer at a corner part of the ceramic capacitor, by considering that the corner part is under a lot of stress and a crack is likely to occur at the corner part that is under a lot of stress by expansion and contraction stress of a solder bonding part attributable to bending stress for a board and a heat shock to the board when the ceramic capacitor is mounted on the board. The ceramic capacitor is a multi-layer ceramic capacitor (MLCC), for example.

FIG. 1 is a perspective view illustrating a ceramic capacitor according to a first embodiment of the present disclosure. FIG. 2 is a front view illustrating the ceramic capacitor according to the first embodiment of the present disclosure. FIG. 3 is a cross-sectional view taken along A-A in FIG. 1. In the drawings of the present disclosure, the thickness of an internal electrode, the thickness of an external electrode, a size thereof, etc. are illustrated as being exaggerated in order to highlight characteristics of the present disclosure, and thus the present disclosure is not limited to the thickness, size, etc. of each electrode.

As illustrated in FIGS. 1 to 3, a ceramic capacitor 100 according to a first embodiment of the present disclosure includes a ceramic body 110, an internal electrode 120, and an external electrode 130.

The ceramic body 110 includes a plurality of dielectric layers. The ceramic body 110 is formed by horizontally stacking a plurality of dielectric layers 111 and then plasticizing the plurality of dielectric layers. The plurality of dielectric layers 111 is in the state in which the plurality of dielectric layers has been sintered. A boundary between adjacent dielectric layers 111 may be integrated to the extent that it is difficult to check the boundary.

A material of the dielectric layer 111 may be barium titanate ($BaTiO_3$)-based ceramics having a high dielectric constant. In addition, (Ca, Zr)(Sr, Ti)$O_3$-based ceramics may be used as the material that forms the dielectric layer 111, or the dielectric layer may additionally include the material. However, it is preferred that the dielectric material $BaTiO_3$ having a high dielectric constant is used because capacitance is proportional to the dielectric constant of dielectric.

As illustrated in FIG. 1, the ceramic body 110 is formed approximately in a rectangular parallelepiped shape, and includes front and rear surfaces that face each other, upper and lower surfaces that face each other, and both end surfaces that face each other. FIG. 2 illustrates a front surface of the ceramic body 110.

As illustrated in FIG. 3, the ceramic body 110 includes the internal electrode 120 formed on the plurality of dielectric layers 111, and may be formed by stacking a plurality of dielectric layers 111 in which the internal electrode 120 has not been formed and a plurality of dielectric layers 111 in which the internal electrode 120 has been formed. The internal electrode 120 consists of at least a pair, and the internal electrodes may be disposed to be spaced apart from each other at a certain interval within the ceramic body 110 so that one end of each internal electrode is exposed to the outside through any one end surface, among both end surfaces of the ceramic body 110.

Specifically, the internal electrode 120 is divided into a first internal electrode 121 and a second internal electrode 122. The first internal electrode 121 and the second internal electrode 122 may be electrically connected to the external electrodes 130 of both end surfaces of the ceramic body 110 through parts that are alternately exposed through the both end surfaces of the ceramic body 110. In the ceramic capacitor 100, when a voltage is applied to the external electrode 130, electric charges are accumulated between the first internal electrode 121 and the second internal electrode 12. In this case, the capacitance is proportional to the area of a region in which the first internal electrode 121 and the second internal electrode 122 overlap.

The internal electrode 120 may be made of one of Cu, Ni, and Pd—Ag or an alloy of them. In order to suppress the oxidation of the internal electrode during a plasticizing process that is performed at a high temperature, Pd, that is, expensive precious metal, may be used as the internal electrode. However, for a cost reduction according to requirements for miniaturization and higher capacity of an MLCC, Pd—Ag, Ni, Cu, etc. may be used as the internal electrode.

The external electrode 130 includes an electrode layer 131 and a conductive resin layer 132. The electrode layers 131 are formed in both end surfaces of the ceramic body 110 and electrically connected to the internal electrodes 120 that are exposed to both sides of the ceramic body 110.

The electrode layers 131 may be formed only in both end surfaces of the ceramic body 110. Alternatively, the electrode layer 131 may have a shape in which the electrode layer extends from each of the both end surfaces of the ceramic body 110 to a front surface, rear surface, upper surface, and lower surface of the ceramic body. In an embodiment, the electrode layer 131 has been illustrated in a shape in which the electrode layer extends from each of the both end surfaces of the ceramic body 110 to the front surface, rear surface, upper surface, and lower surface thereof. If the electrode layer 131 has the shape in which the electrode layer extends from both end surfaces of the ceramic body 110 to the front surface, rear surface, upper surface, and lower surface thereof, there is an effect in that the occurrence of a crack is reduced by increasing tensile strength of the ceramic body 110. The electrode layer 131 may be made of Cu having high electrical conductivity.

The conductive resin layer 132 is formed to cover a part of the electrode layer 131 and to surround the corner of a lower part of the ceramic body 110. For example, the conductive resin layer 132 is formed on both sides of the ceramic body 110, and prevents a crack of a corner part on which stress is concentrated.

The conductive resin layer 132 may include a part that is disposed on the electrode layer 131 and a part that is disposed on the ceramic body 110. The part of the conductive resin layer 132, which is disposed on the ceramic body 110, is formed on the front and rear surfaces and lower surface of the ceramic body 110. That is, the conductive resin layer 132 covers a part of the electrode layer 131, includes the part that is disposed on the ceramic body 110, and has a function for absorbing a shock to the corner part and prevents external moisture from being introduced into the electrode layer 131.

The conductive resin layer 132 has a shape in which the conductive resin layer surrounds the middle to lower part of the ceramic body 110 in a height direction thereof at the corner of the ceramic body. That is, the conductive resin layer 132 has approximately an L-shaped or triangular shape in which the area of the conductive resin layer is widened to a lower part thereof, and prevents the occurrence of a crack according to a concentration of stress on the lower corner part of the ceramic body 110. The conductive resin layer 132 is made of resin including Ag. For example, the conductive resin layer 132 is made of Ag epoxy. That is, the conductive resin layer 132 is formed by uniformly mixing Ag powder having electrical conductivity with epoxy resin.

Equivalent series resistance (ESR) can be increased by increasing resistance by adjusting a content of Ag included in the conductive resin layer 132. For example, a material having high resistance is used for the electrode layer 131 of the external electrode 130 and a plating layer to be described later, and the conductive resin layer 132 formed at a corner region of the ceramic body 110 includes Ag having high electrical conductivity, but the resin content is increased and the Ag content is decreased. Accordingly, a broadband characteristic can be achieved by increasing ESR by increasing resistance of the external electrode 130 on a lower side.

The external electrodes 130 and 130-1 may further include first plating layers 133 and 133-1, respectively.

FIG. 4 is a longitudinal cross-sectional view illustrating a form including the first plating layer in the ceramic capacitor according to the first embodiment of the present disclosure. FIG. 5 is a front view illustrating a form of a modified example including the first plating layer in the ceramic capacitor according to the first embodiment of the present disclosure. FIG. 6 is a longitudinal cross-sectional view illustrating a form of a modified example including the first plating layer in the ceramic capacitor according to the first embodiment of the present disclosure.

As illustrated in FIG. 4, the external electrode 130 may further include the first plating layer 133 disposed to cover the conductive resin layer 132. The first plating layer 133 may have a shape in which the first plating layer covers only the conductive resin layer 132. For example, the first plating layer 133 may have a shape in which the first plating layer covers a part of the electrode layer 131 and the entire conductive resin layer 132. The first plating layer 133 may be formed of an Ni plating layer.

Alternatively, as illustrated in FIGS. 5 and 6, the first plating layer 133-1 of a modified example may have a shape in which the first plating layer covers the electrode layer 131 and the conductive resin layer 132. For example, the first plating layer 133-1 may have a shape in which the first plating layer fully covers the electrode layer 131 and the conductive resin layer 132. The first plating layer 133-1 of a modified example may be formed of an Ni plating layer.

External electrodes 130-2, 130-3, and 130-4 may further include second plating layers 134, 134-1, and 134-2, respectively.

FIG. 7 is a longitudinal cross-sectional view illustrating a form including a second plating layer in a ceramic capacitor according to a second embodiment of the present disclosure.

As illustrated in FIG. 7, the external electrode 130-2 of a ceramic capacitor 100-2 according to the second embodiment may further include the second plating layer 134 disposed to cover a part of or the entire first plating layer 133. The second plating layer 134 is formed of an Sn plating layer. The Sn plating layer can increase an adhesive force for a board and improve moisture resistance.

The second plating layer 134 may be formed in a shape in which the second plating layer covers the first plating layer 133 that is formed on the electrode layer 131 and the conductive resin layer 132. For example, the second plating layer 134 may be formed in a shape in which the second plating layer comes into contact with the electrode layer 131 from a middle part of the electrode layer to an upper side thereof and comes into contact with the first plating layer 133 from a middle part of the electrode layer to a lower side thereof, in a height direction of the ceramic body 110, and may have a shape in which the second plating layer covers the electrode layer 131 and the first plating layer 133. In this case, the second plating layer 134 has a structure in which the second plating layer generally surrounds the parts of the electrode layer 131 and the first plating layer 133 that are exposed to the outside, so that an adhesive force for a board is improved and moisture resistance is also improved.

FIG. 8 is a perspective view illustrating a form of a first modified example including the second plating layer in the ceramic capacitor according to the second embodiment of the present disclosure. FIG. 9 is a longitudinal cross-sectional view illustrating a form of the first modified example including the second plating layer in the ceramic capacitor according to the second embodiment of the present disclosure.

As illustrated in FIGS. 8 and 9, the ceramic capacitor 100-3 according to the first modified example of the second embodiment is formed so that a conductive resin layer 132-1 covers a part of an electrode layer 131 and surround four corners of a lower part of the ceramic body 110. Accordingly, the ceramic capacitor has a structure in which the electrode layer 131 is exposed between two conductive resin layers 132-1 formed at the corners in both end surfaces of the ceramic body 110. Furthermore, a first plating layer 133 is formed to surround the conductive resin layer 132-1 formed to surround the four corners of the lower part of the ceramic body 110.

The external electrode 130-3 may include the second plating layer 134-1 that exposes, to the outside, the electrode layer 131 of the remaining parts except a part covered with the conductive resin layer 132-1 and that covers only the part of the first plating layer 133. That is, the conductive resin layer 132-1 may have a shape in which the conductive resin layer exposes the electrode layer 131, that is, a middle part of both end surfaces of the ceramic body 110. The second plating layer 134-1 is formed of an Sn plating layer and can increase an adhesive force for a board. Furthermore, a solder bonding part for a connection with a board may be attached to at least a part of the electrode layer 131 because the conductive resin layer 132-1 and the second plating layer 134-1 are not formed in the electrode layer 131 exposed between two corners in both end surfaces of the ceramic body 110. In this case, a current path can be reduced and ESR can be adjusted by reducing resistance because the solder bonding part comes into direct contact with the electrode layer 131.

FIG. 10 is a perspective view illustrating a form of a second modified example including the second plating layer in the ceramic capacitor according to the second embodiment of the present disclosure. FIG. 11 is a longitudinal cross-sectional view illustrating a form of the second modified example including the second plating layer in the ceramic capacitor according to the second embodiment of the present disclosure.

As illustrated in FIGS. 10 and 11, the external electrode 130-4 of the ceramic capacitor 100-4 according to the second modified example of the second embodiment may further include a first plating layer 133-1 formed to cover all of the electrode layer 131 and the conductive resin layer 132 and the second plating layer 134-2 disposed to cover a part of the first plating layer 133-1. The second plating layer 134-2 is formed of an Sn plating layer.

The second plating layer 134-2 is formed in a shape in which the second plating layer comes into contact with the first plating layer 133-1 that is formed from a middle part of the ceramic body 110 to a lower side thereof in a height direction thereof. In this case, an adhesive force for a board can be improved and moisture resistance can be improved because the second plating layer 134-2 has a structure in which the second plating layer surrounds a part of the first plating layer 133-1 disposed at a corner part on a lower side of the ceramic body 110. At least a part of a solder bonding part for a connection with the board may be attached to the part of the first plating layer 133-1 that is exposed to the outside. In this case, ESR can be adjusted and a broadband characteristic can be achieved by increasing resistance through the part at which the solder bonding part comes into direct contact with the first plating layer 133-1.

In the first embodiment to the second embodiment, the external electrode having a two-layer to three-layer structure may be formed to include the conductive resin layer 132, 132-1 from the middle part of the ceramic body 110 to the lower part thereof in the height direction thereof at the corner of the ceramic body 110, and the external electrode having a one-layer to three-layer structure may be formed without including the conductive resin layer 132, 132-1 from the middle part of the ceramic body to the upper side thereof in the height direction. For example, the ceramic body 110 may have a structure in which a Cu electrode layer, an Ag epoxy conductive resin layer, an Ni plating layer, and an Sn plating layer have been sequentially stacked from a middle part of the ceramic body to a lower part thereof in a height direction thereof at a corner of the ceramic body, and may have a structure in which the Cu electrode layer, the Ni plating layer, and the Sn plating layer have been sequentially stacked from a middle part of the ceramic body to an upper side thereof in the height direction.

In the structure, the Ag epoxy conductive resin layer 132 can prevent a crack by absorbing a shock at the place on which stress is concentrated by surrounding four corners of the lower part of the ceramic body 110, and can implement a broadband characteristic by increasing resistance by lowering an Ag content.

Furthermore, the electrode layer 131 or the first plating layer 133 may be exposed to the outside in both end surfaces of the ceramic body 110, and at least a part of the solder bonding part may be bonded to the exposed electrode layer 131 or first plating layer 133. Accordingly, ESR may be designed to be high or low, and a broadband characteristic can be implemented.

Hereinafter, a method of manufacturing a ceramic capacitor according to a first embodiment of the present disclosure is described.

FIG. 12 is a process diagram illustrating a method of manufacturing a ceramic capacitor according to the first embodiment of the present disclosure. FIG. 13 is a construction diagram illustrating a method of forming a conductive resin layer in the method of manufacturing a ceramic capacitor according to the first embodiment of the present disclosure.

As illustrated in FIG. 12, the method of manufacturing a ceramic capacitor according to the first embodiment of the present disclosure includes a step S10 of forming a ceramic body including front and rear surfaces that face each other, upper and lower surfaces that face each other, and both end surfaces that face each other and having one end of an internal electrode exposed to the both end surfaces, a step S20 of forming an electrode layer in each of the both end surfaces of the ceramic body so that the electrode layer is electrically connected to the one end of the internal electrode, and a step S30 of forming a conductive resin layer that covers a part of the electrode layer and that surrounds corners of a lower part of the ceramic body.

In the step S10 of forming the ceramic body, the ceramic body may be formed by compressing a stack body formed by stacking a ceramic green sheet in which an internal electrode pattern has been formed and then cutting and plasticizing the stack body. The internal electrode pattern may be formed by printing the internal electrode on an upper surface of a ceramic green sheet on which slurry having additives mixed with dielectric powder has been thinly coated. The stack body may be formed by stacking a green sheet on which such an internal electrode has been printed in multiple layers.

In the step S20 of forming the electrode layer in both end surfaces of the ceramic body, the electrode layer 131 may be formed by applying paste including conductive metal to each of the both end surfaces of the ceramic body 110 and then plasticizing the paste.

Referring to FIG. 13, in the step S30 of forming the conductive resin layer, the conductive resin layer 132 may be formed by a method of dipping the corners of the lower part of the ceramic body 110 in which the electrode layer 131 has been formed into a resin solution including Ag.

When the ceramic body 110 is dipped into the resin solution m including Ag, the dipping area of the corners of the ceramic body 110 can be accurately controlled by a support jig G that supports one side and the other side of the ceramic body 110 at a predetermined angle.

The support jig G may have a structure in which the support jig is installed at the top of the resin solution m including Ag in a cover form and includes an insertion hole into which the corner parts of the ceramic body 110 are inserted and a slope in which the corners of the ceramic body 110 can be inserted into the insertion hole p at a predetermined angle has been formed. An inclined angle and entrance size of the slope of the insertion hole may be designed and manufactured to have accurate sizes by considering the dipping area of the corners of the ceramic body 110. For example, when the ceramic body 110 is dipped into the resin solution including Ag, the dipping of the corners of the ceramic body 110 may be performed by using the support jig G that supports one side and the other side of the ceramic body 110 and in which the insertion hole p having a bilateral slope has been formed so that the corner parts of the ceramic body 110 are disposed at the lowest place.

Referring to FIG. 13, the conductive resin layer 132 made of Ag epoxy is also formed at corners of a end surface of the ceramic body 110 on the other side thereof, by dipping corners of the ceramic body 110 on one side thereof into the resin solution m including Ag through the insertion hole p of the support jig G, taking out the ceramic body, and forming the conductive resin layer 132 coming into contact with the electrode layer 131 at the corners of the ceramic body on the one side, and then dipping the corners of the ceramic body on the other side thereof, that is, a side opposite to the one side of the ceramic body, into the resin solution m including Ag through the insertion hole p of the support jig G, and taking out the ceramic body.

In the step of forming the conductive resin layer, an application thickness of the conductive resin layer may be controlled by adjusting a dipping process parameter. For example, the application thickness of the conductive resin layer may be adjusted to a desired thickness and the conductive resin layer may be uniformly applied, by dipping the corners of the ceramic body 110 on one side thereof into the resin solution m including Ag twice, but adjusting a primary dipping time and a secondary dipping time. The thickness of the conductive resin layer 132 may be approximately 10 μm to 20 μm, and the thickness thereof may gradually become thin toward an end of the conductive resin layer at an edge thereof. If the thickness of the conductive resin layer 132 is approximately 10 μm or less, electrical conductivity is reduced and it is difficult to expect a crack prevention effect because the application thickness is not uniform and the density of an Ag layer that forms an electrode is reduced. When the thickness of the conductive resin layer 132 is 20 μm or less, it is possible to secure a high shock absorption function and excellent reliability.

In the step of forming the conductive resin layer, the conductive resin layer may be hardened at 300 degrees or less after the dipping. The conductive resin layer 132 has an effect in that it prevents a crack through the forming of a shock absorption layer with respect to external stress by assigning softness to the external electrode.

After the step of forming the conductive resin layer, the method may further include a step of forming the plating layers 133-1 and 134-2 that cover the electrode layer 131 and the conductive resin layer 132 (refer to FIG. 11). The plating layer may have a one-layer structure including an Ni plating layer or a two-layer structure including an Ni plating layer and an Sn plating layer.

Alternatively, after the step of forming the conductive resin layer, the method may further include a step of forming the plating layers 133 and 134-1 that cover a part of the electrode layer 131 and the conductive resin layer 132-1 (refer to FIG. 9). The plating layers 133 and 134-1 may each have a one-layer structure including an Ni plating layer or a two-layer structure including an Ni plating layer and an Sn plating layer (or an SnPb plating layer). The plating layers 133 and 134-1 may each be formed by an electroplating process.

In the aforementioned embodiments of the present disclosure, the ceramic body is formed, and the electrode layer, the conductive resin layer, and the plating layer are formed by using the same method as that of manufacturing a ceramic capacitor according to the first embodiment. Materials and manufacturing processes that are used in the aforementioned embodiments and the first embodiment are the same except shapes of the ceramic capacitors.

In the embodiments of the present disclosure according to the aforementioned method, the ceramic capacitor has the shock absorption function because the conductive resin layer 132, 132-1 is formed at the lower corner area that is under the most stress. Accordingly, when the ceramic capacitor is mounted on a board, the occurrence of a crack is prevented although the corner part is under a lot of stress due to a difference in the coefficient of thermal expansion.

Furthermore, a broadband characteristic can be implemented because ESR can be adjusted in a way to increase electrical resistance by including Ag in the conductive resin layer so that the conductive resin layer has an electrical conductivity characteristic, but lowering an Ag content.

The ceramic capacitor of the aforementioned embodiments may be used as an MLCC which is applied to various items, such as smartphones, PC, TV, and electric vehicles.

The above description is merely a description of the technical spirit of the present disclosure, and those skilled in the art may change and modify the present disclosure in various ways without departing from the essential characteristic of the present disclosure. Accordingly, the embodiments described in the present disclosure should not be construed as limiting the technical spirit of the present disclosure, but should be construed as describing the technical spirit of the present disclosure. The technical spirit of the present disclosure is not restricted by the embodiments. The range of protection of the present disclosure should be construed based on the following claims, and all of technical spirits within an equivalent range of the present disclosure should be construed as being included in the scope of rights of the present disclosure.

The invention claimed is:

1. A method of manufacturing a ceramic capacitor, comprising steps of:

forming a ceramic body comprising front and rear surfaces that face each other, upper and lower surfaces that face each other, and both end surfaces that face each other and having one end of an internal electrode exposed to the both end surfaces;

forming an electrode layer in each of the both end surfaces of the ceramic body so that the electrode layer is electrically connected to the one end of the internal electrode; and forming a conductive resin layer that covers a part of the electrode layer and that surrounds corners of a lower part of the ceramic body, wherein in the step of forming the conductive resin layer, the conductive resin layer is formed by a method of dipping the corners of the lower part of the ceramic body in which the electrode layer has been formed into a resin solution comprising Ag, and wherein in the method of dipping the corners of the lower part of the ceramic body in which the electrode layer has been formed into the resin solution comprising Ag, the dipping of the corners of the ceramic body is performed by using a support jig that supports one side and the other side of the ceramic body and in which an insertion hole having a bilateral slope has been formed so that corner parts of the ceramic body are disposed at a lowest place.

2. The method of claim 1, wherein the electrode layer is formed by applying paste comprising conductive metal to each of the both end surfaces of the ceramic body and plasticizing the paste.

3. The method of claim 1, wherein in the method of dipping the corners of the lower part of the ceramic body in which the electrode layer has been formed into the resin solution comprising Ag, when the ceramic body is dipped into the resin solution comprising Ag, a dipping area of the corners of the ceramic body is accurately controlled by a support jig that supports one side and the other side of the ceramic body at a predetermined angle.

4. The method of claim 1, further comprising a step of forming a plating layer that covers the electrode layer and the conductive resin layer, after the step of forming the conductive resin layer.

5. The method of claim 1, further comprising a step of forming a plating layer that covers a part of the electrode layer and the conductive resin layer, after the step of forming the conductive resin layer.

* * * * *